United States Patent
Eller et al.

(10) Patent No.: US 6,211,401 B1
(45) Date of Patent: Apr. 3, 2001

(54) PROCESS FOR PREPARING POLYTETRAHYDROFURAN

(75) Inventors: Karsten Eller, Ludwigshafen; Christoph Sigwart, Schriesheim; Rainer Becker, Bad Dürkheim; Klaus-Dieter Plitzko, Limburgerhof; Rolf Fischer, Heidelberg; Frank Stein, Bad Dürkheim; Ulrich Müller, Neustadt; Michael Hesse, Worms, all of (DE)

(73) Assignee: BASF Aktiengesellschaft, Ludwigschafen (DE)

( * ) Notice: Subject to any disclaimer, the term of this patent is extended or adjusted under 35 U.S.C. 154(b) by 0 days.

(21) Appl. No.: 09/308,320

(22) PCT Filed: Nov. 18, 1997

(86) PCT No.: PCT/EP97/06426

§ 371 Date: May 19, 1999

§ 102(e) Date: May 19, 1999

(87) PCT Pub. No.: WO98/24829

PCT Pub. Date: Jun. 11, 1998

(30) Foreign Application Priority Data

Dec. 2, 1996 (DE) ............................................. 196 49 803

(51) Int. Cl.$^7$ ............................. C07C 67/24; C07C 43/20
(52) U.S. Cl. ........................ 560/240; 560/103; 568/605; 568/617
(58) Field of Search .................................. 560/240, 103; 568/605, 617

(56) References Cited

U.S. PATENT DOCUMENTS 5,344,964  9/1994  Chu et al. ............................ 560/240
5,463,020  10/1995  Becker et al. ........................ 528/408
5,773,648  6/1998  Becker et al. ........................ 560/240
5,939,590  * 8/1999  Sigwart et al. .

FOREIGN PATENT DOCUMENTS 4433606   3/1996  (DE) .
19507399  9/1996  (DE) .
19641481  4/1998  (DE) .
96/09335  3/1996  (WO) .

OTHER PUBLICATIONS

S. Rondon, et al. Surface and Interface Analysis, 1998; 26, 329; (p. 332, 2nd paragraph).*

Quafi, et al., Catalysis Today, 1988, 4, 23; (p. 31, lines 23–24).*

*Pat. Abst. of Japan*, vol. 95, No. 11, Dec. 26, 1995 (JP 07228684).

* cited by examiner

*Primary Examiner*—James O. Wilson
*Assistant Examiner*—Robert W. Deemie
(74) *Attorney, Agent, or Firm*—Keil & Weinkauf

(57) ABSTRACT

Polytetrahydrofuran, tetrahydrofuran copolymers, diesters or monoesters of these polymers are prepared by polymerizing tetrahydrofuran in the presence of at least one telogen and/or comonomer on a heterogeneous carrier catalyst which contains on an oxidic carrier material as active mass a catalytically active amount of at least one oxygenous molybdenum and/or tungsten compound and, when the precursor compounds of the active mass have been applied to the carrier material precursor, has been calcined at temperatures of between 500° C. and 1000° C. The catalyst used contains a promotor which comprises at least one element or a compound of an element of the 2nd, 3rd including the lanthanides, 5th, 6th, 7th, 8th or 14th group of the periodic system of elements.

12 Claims, No Drawings

PROCESS FOR PREPARING POLYTETRAHYDROFURAN

SUMMARY

Polytetrahydrofuran, tetrahydrofuran copolymers, and diesters or monoesters of these polymers are prepared by the polymerization of tetrahydrofuran in the presence of at least one telogen and/or comonomer over a heterogeneous supported catalyst which contains an active component comprising a catalytically active amount of at least one oxygen-containing tungsten and/or molybdenum compound on an oxidic support material and which, following application of the precursor compounds of the active component to the support material precursor, has been calcined at temperatures of from 500° C. to 1000° C., where a catalyst is used which contains a promotor comprising at least one element of Group 2, 3 (including the lanthanides), 5, 6, 7, 8 or 14 of the Periodic Table or a compound of such element.

DESCRIPTION

The present invention relates to an improved process for the preparation of polytetrahydrofuran, tetrahydrofuran copolymers, and diesters or monoesters of these polymers by the polymerization of tetrahydrofuran in the presence of at least one telogen and/or comonomer over a heterogeneous supported catalyst, which contains as active composition a catalytically active amount of at least one oxygen-containing molybdenum and/or tungsten compound on an oxidic support material and which has been calcined, following application of the precursor compounds of the active composition to the support material precursor, at temperatures of from 500° C. to 1000° C.

Polytetrahydrofuran ("PTHF"), also known as poly (oxybutylene glycol), is a broadly used intermediate in the plastics and synthetic fiber industries and serves inter alia for the preparation of polyurethane, polyester and polyamide elastomers. In addition, it is, as are also some of its derivatives, a valuable auxiliary for many applications, such as dispersing agents, or for the process of decolorizing ("de-inking") waste paper.

PTHF is advantageously prepared on an industrial scale by polymerization of tetrahydrofuran over catalysts in the presence of reagents, the addition of which makes it possible to control the chain length of the polymer chains and thus to set the average molecular weight to the desired value (chain-terminating agents or "telogens"). Control takes place in this case by varying the type and amount of the telogen. By selecting suitable telogens functional groups can be additionally introduced at one or both ends of the polymer chain. Thus for example by using carboxylic acids or carboxylic acid anhydrides as telogens the monoesters or diesters of PTHF can be prepared. Other telogens are effective not only as chain-terminating agents, but are also incorporated in the growing polymer chain of the PTHF, that is to say they not only operate as a telogen, but also as a comonomer and can therefore be equally well designated as a telogen or as a comonomer. Examples of such comonomers are telogens containing two hydroxyl groups such as the di-alcohols. Examples of such di-alcohols are ethylene glycol, propylene glycol, butylene glycol, 1,4-butanediol, 2-butyne-1,4-diol,1,6-hexanediol or low molecular weight PTHF. The use of such comonomers leads to the preparation of tetrahydrofuran copolymers. In this manner it is possible to chemically modify the PTHF. One example thereof is the use of the telogen 2-butyne-1,4-diol, the addition of which causes a proportion of C≡C triple bonds to be present in the polymer chains of the PTHF. Such modified PTHF can, due to the reactivity of these triple bonds at these sites, be further refined chemically, for example by hydrogenation of the triple bonds to double bonds, by subsequent addition polymerization of different monomers ("grafting") for varying the properties of the polymer, cross linkage for the formation of polymers having a comparatively rigid structure, or other measures commonly used in polymer chemistry. Total hydrogenation of the triple bonds that are present is likewise possible and generally leads to PTHF having a particularly low color index.

DE-A 4,433,606 describes a process for the preparation of PTHF, PTHF diesters of $C_2$–$C_{20}$ monocarboxylic acids or PTHF monoesters of $C_1$–$C_{10}$ monocarboxylic acids by the polymerization of tetrahydrofuran over a heterogeneous catalyst in the presence of one of the telogens water, 1,4-butanediol, PTHF having a molecular weight of from 200 to 700 dalton, a $C_1$–$C_{10}$ monocarboxylic acid or a carboxylic anhydride derived from $C_2$–$C_{20}$ monocarboxylic acids or mixtures of these telogens, where the catalyst is a supported catalyst which contains a catalytically active amount of an oxygen-containing tungsten or molybdenum compound or mixtures of these compounds on an oxidic support material and which, following application of the precursor compounds of the oxygen-containing molybdenum and/or tungsten compounds to the support material precursor, has been calcined at temperatures of from 500° C. to 1000° C.

WO 96/09335 teaches a process for the preparation of PTHf or PTHF monoesters of $C_1$–$C_{10}$ monocarboxylic acids by the polymerization of tetrahydrofuran over a heterogeneous catalyst in the presence of one of the telogens water, 1,4-butanediol, PTHF having a molecular weight of from 200 to 700 dalton, a $C_1$–$C_{10}$ monocarboxylic acid or mixtures of these telogens, where the catalyst is a supported catalyst which contains a catalytically active amount of an oxygen-containing tungsten or molybdenum compound or mixtures of these compounds on an oxidic support material and which, following application of the precursor compounds of the oxygen-containing molybdenum and/or tungsten compounds to the support material precursor, has been calcined at temperatures of from 500° C. to 1000° C.

The prior German patent application DE-A 19641481.4 of Sep. 10, 1996 teaches a process for the preparation of polytetrahydrofuran, copolymers of tetrahydrofuran and 2-butyne-1,4-diol, diesters of these polymers with $C_2$–$C_{20}$ monocarboxylic acids or monoesters of these polymers with $C_1$–$C_{10}$ monocarboxylic acids by the polymerization of tetrahydrofuran in the presence of one of the telogens water, 1,4-butanediol, 2-butyne-1,4-diol, polytetrahydrofuran having a molecular weight of from 200 to 700 dalton, a $C_1$–$C_{10}$ monocarboxylic acid or a carboxylic acid anhydride derived from $C_2$–$C_{20}$ monocarboxylic acids or mixtures of these telogens over a heterogeneous supported catalyst which contains a catalytically active amount of an oxygen-containing tungsten or molybdenum compound or mixtures of these compounds on an oxidic support material and which, following application of the precursor compounds of the oxygen-containing molybdenum and/or tungsten compounds to the support material precursor, has been calcined at temperatures of from 500° C. to 1000° C. and which has been activated before use as polymerization catalyst by treatment with a reducing agent.

Since the economical value of a PTHF process catalyzed using a heterogenous catalyst greatly depends on the productivity of the catalyst, it is an object of the present invention to increase the catalyst activity of the known catalysts used in THF polymerization in order to achieve higher polymer yields and/or space-time yields.

Accordingly we have found a process for the preparation of polytetrahydrofuran, tetrahydrofuran copolymers, and diesters or monoesters of these polymers by the polymerization of tetrahydrofuran in the presence of at least one telogen and/or comonomer over a heterogeneous supported catalyst which contains an active component comprising a catalytically active amount of at least one oxygen-containing tungsten and/or molybdenum compound on an oxidic support material and which, following application of the precursor compounds of the active component to the support material precursor, has been calcined at temperatures of from 500° C. to 1000° C. and which is characterized in that a catalyst is used which contains a promotor comprising at least one element of Group 2, 3 (including the lanthanides), 5, 6, 7, 8 or 14 of the Periodic Table or a compound of such element.

The polymerization catalysts used in the process of the invention are supported catalysts on an oxidic support material, which contain oxygen-containing molybdenum or tungsten compounds or mixtures thereof acting as the catalytically active component ("active composition") and at least one promotor of Group 2, 3 (including the lanthanides), 5, 6, 7, 8 or 14 of the Periodic Table or compound of such promotor.

Suitable support materials are generally oxidic supports, for example zirconium dioxide, titanium dioxide, hafnium oxide, yttrium oxide, iron(III) oxide, aluminum oxide, tin (IV) oxide, silicon dioxide, zinc oxide or mixtures of these oxides, but we prefer to use zirconium dioxide or titanium dioxide, titanium dioxide being particularly preferred.

Suitable active compositions are oxygen-containing molybdenum or tungsten compounds or mixtures of such compounds, where the use of oxygen-containing tungsten compounds or mixtures of oxygen-containing tungsten compounds with molybdenum compounds containing oxygen, in which the content of tungsten compound predominates, is preferred. We particularly prefer to use catalysts in which the active composition comprises, apart from the usual impurities, virtually only oxygen-containing tungsten compounds.

The exact chemical and physical structure of the active composition is unknown. For the sake of simplicity the content of active composition in the catalyst is based on the trioxides of tungsten or molybdenum.

The catalysts generally contain from 0.1 to 50 wt %, preferably from 5 to 40 wt % and more preferably from 5 to 25 wt %, of active composition, calculated as $MoO_3$ or $WO_3$, based on the total weight of the catalyst.

Suitable components of the promotor are metals or compounds of metals of Groups 2 (Be, Mg, Ca, Sr, Ba), 3 (Sc, Y, La) including the lanthanides (Ce, Pr, Nd, Pm, Sm, Eu, Gd, Th, Dy, Ho, Er, Tm, Yb, Lu), 5 (V, Nb, Ta), 6 (Cr), 7 (Mn, Re), 8 (Fe, Ru, Os) and 14 (Ge, Sn, Pb) of the Periodic Table.

Preferred is the use of Ba, Y, La, Ce, Nb, Cr, Mn, Fe, Ru and Sn or compounds thereof and the use of Nb, Fe, Y and Cr or compounds thereof is especially preferred.

The promotor can comprise the said elements individually or in admixture with each other or in admixture with compounds thereof or be a mixture of the compounds thereof. The exact chemical and physical structure of the components of the promotor is unknown. Without binding ourselves to a model, it is assumed that not later than the point following the calcining treatment of the catalyst the components of the promotor are not present in the form of the elements, but for the sake of simplicity the content of promotor in the catalyst is stated as being the content of metal in the promotor.

The catalysts generally contain from 0.01 to 30 wt %, preferably from 0.05 to 20 wt % and more preferably from 0.1 to 15 wt % of promotor, calculated as the sum of its components in the form of their elements and based on the total weight of the catalyst. In many cases, especially as regards the preferred or particularly preferred uses of promotor constituents, the promotor concentration ranges from 0.2 to 3 wt %. The amount of promotor required to optimize a certain desired property of the PTHF to be synthesized (activity, average molecular weight or dispersion) or the type and amount of its components can be simply determined by carrying out a few routine tests.

In addition to the active composition and the promotor, the catalyst can also contain sulfur and/or phosphorus, a catalyst containing added sulfur being preferred. Without binding ourselves to a model, it is assumed below that the sulfur in the catalysts of the invention is present as sulfate and the phosphorus as phosphate. The catalysts can contain from 0.01 to 15 wt %, preferably from 0.1 to 10 wt %, particularly 0.25 to 5 wt %, of oxygen-containing sulfur or phosphorus compounds, calculated as sulfate or phosphate and based on the total weight of the catalyst.

The preparation of the catalysts to be used in the process of the invention is carried out in a similar manner to the methods described in DE-A 4,433,606 or WO-A 96/09335, incorporated rated herein by reference, for the preparation of the catalysts used in the processes described in said specifications for the preparation of PTHF. The catalysts to be used in the process of the invention differ from those revealed in DE-A 4,433,606 and WO-A 96/09335 substantially only in the presence of the promotor.

The preparation of the catalysts generally starts with a support material or a precursor of a support material which is converted to the support material during the preparation of the catalyst, especially during calcination, as far as possible or completely. We preferably start from support precursors containing a number of hydroxyl groups, such as freshly precipitated hydroxide. It is however likewise possible to use commercial oxides as supports or hydroxides which have been dried following precipitation thereof. The precipitation of hydroxides takes place in known manner, for example by addition of ammonia or aqueous ammonia solution to soluble or hydrolysable compounds of those elements of which the oxides form the support material, and separation of the precipitate. Subsequent drying can take place at from 20° to 350° C., preferably at from 50° to 150° C., and particularly from 100° to 130° C., at atmospheric pressure or reduced pressure.

A very suitable support is titanium dioxide predominantly present in the anatase form. We prefer to use a titanium dioxide containing not more than 35 wt % of the rutile and brookit modifications.

This titanium dioxide can be prepared, for example, by calcination during the preparation of the catalyst from titanium hydroxide. Titanium hydroxide can be produced by precipitation from a hydrolysable titanium starting compound. Suitable hydrolysable starting compounds for the preparation of the titanium hydroxide are for example the halides, nitrates or alkoxides. Examples of suitable starting compounds are titanium tetraisopropylate, titanyl chloride, titanyl nitrate, titanium tetrachloride or titanyl sulfate. The hydroxide is preferably precipitated from solutions of these compounds by the addition of ammonia solution. Suitable solvents for the titanium starting compounds are all solvents in which the starting compounds are soluble and can be precipitated by means of aqueous ammonia solution. Examples of such solvents are the $C_1$–$C_8$ alcohols, such as methanol, ethanol, propanol, isopropanol, n-butanol, isobutanol, tert-butanol, pentanol, hexanol or 2-ethylhexanol. It is basically also possible to precipitate titanium hydroxide from these alcoholic solutions by the addition of water or dilute sulfuric acid.

When the hydroxide is precipitated, there is generally formed a gel-like precipitate, which gives a radio-amorphous powder on drying. It is possible that these radio-amorphous precipitates are composed of not only the hydroxides but also of a large number of different compounds containing hydroxyl groups, for example different oxide hydrates, meta acids, or polymeric, water-insoluble hydroxide complexes. Since the exact chemical composition of these precipitates cannot be determined however, it is assumed, for the sake of simplicity, that they comprise the hydroxide. Thus the term "hydroxide" is used for the purposes of this application as a collective term denoting the precipitates containing hydroxyl groups as produced by the above methods. From the hydroxide water may be extracted, by a commonly used drying method, for example by heating to 90° to 150° C. and/or by the use of reduced pressure such that a free-flowing powder having good handling properties is formed.

The precursor compounds of the active composition and the components of the promotor are applied to the supports or support precursors by known methods.

One method, preferred for its simplicity, is the impregnation of the support or support precursor with a solution of precursor compounds. Basically it is possible to use arbitrary solvents, pure or in admixture with each other, and arbitrary precursor compounds, where the precursor compounds should be soluble in the solvents or solvent mixture used under the process conditions used, such as temperature and concentration. The choice of solvents and precursor compounds can be met as routine matter by reference to a solubilities table. We prefer to use water as solvent. To increase the solubility, particularly that of the molybdenum or tungsten compounds, an aqueous ammonia solution may be used as solvent.

The water-soluble precursor compounds of the active composition can be, for example, the water-soluble salts of molybdic acid ($H_2MoO_4$) or tungstic acid ($H_2WO_4$), such as are produced for example when molybdenum trioxide ortungsten trioxide is dissolved in aqueous ammonia or the isopoly compounds resulting therefrom are acidified.

The water-soluble precursor compounds of the promotor constituents can be the water-soluble salts of the corresponding metals. Provided that the corresponding anion does not impair the properties of the catalyst for polymerization of THF, which may be readily ascertained by carrying out simple routine tests, suitable salts can be selected from a solubilities table. Examples of suitable salts are barium acetate, yttrium nitrate, lanthanum or cerium sulfate or nitrate, niobium oxalate or niobium/ammonium oxalate, ammonium dichromate, manganese nitrate, iron sulfate or nitrate, ruthenium chloride or tin sulfate.

If it is desired to prepare a catalyst having a content of sulfur and/or phosphorus, there is added to the impregnation solution at least one sulfur and/or phosphorus compound. The choice of this compound or these compounds is not subject to any particular limitation. Examples of useful sulfur- or phosphorus-containing compounds are sulfuric acid, soluble sulfates such as ammonium sulfate or ammonium hydrogen sulfate or the corresponding sulfites or hydrosulfites, phosphoric acid, soluble phosphates such as ammonium phosphate or the ammonium hydrogen phosphates or the corresponding phosphites. The addition of sulfur and/or phosphorus can take place in a simple manner by the use of soluble promotor precursor constituets containing sulfur or phosphorus, for example their sulfates, unless this is offset by unduly low solubility in the impregnating materials.

It is possible to apply the promotor constituents or the precursors thereof prior to, together with, or after the active composition or their precursors or optionally prior to, together with, or after the addition of sulfur and/or phosphorus. It is likewise possible to apply various components of the active composition, the promotor, sulfur or phosphorus in a number of impregnation steps. It is also possible to apply the total amount of active composition, promotor and optionally sulfur and/orphosphorus not in a single step but successively in a number of impregnation steps.

If several impregnation steps are used, drying and/or calcination can take place between the separate steps, and advantageously at least one drying step is carried out.

It is generally simpler, however, and therefore a preferred method, to apply, simultaneously, the entire active composition and all promotor constituents and any sulfur and/or phosphorus to be added, by impregnating the support or support precursor with a solution which contains both at least one precursor compound of the active composition and at least one precursor compound of the promotor and, optionally, the sulfur and/or phosphorus to be added followed by drying and calcination.

The impregnated supports or support precursors are generally dried at temperatures of from 80° to 500° C., preferably from 100° to 350° C., at atmospheric pressure or reduced pressure. This produces the catalyst precursor.

In a possibly advantageous embodiment, the preparation of the catalyst precursor may be carried out by intimately blending the said precursor compounds of the active composition and the promotor and any sulfur and/or phosphorus to be added, as undissolved compounds, with the support or support precursor in suitable apparatus, for example a kneader or pug mill, in which case auxiliaries such as polyethylene or butylene glycols can be added. This method can also involve the use of compounds which are insoluble in water or other solvents, for example $MoO_3$, $WO_3$, $H_2WO_4$, $Ba_5O_4$ or FeOOH. It is also conceivable to combine impregnating steps with previous blending of solid constituents. For example, a mixture of titanium dioxide and a tungsten compound such as $H_2WO_2$ can be first and this then dried if necessary before it is impregnated with a solution of a promotor precursor, e.g. manganese nitrate. Alternatively, a support or support precursor can be first of all impregnated with a soluble compound such as ammonium dichromate and then, optionally after drying, blended with a solid tungsten compound such as $WO_3$. It is possible, in all of these steps, to add sulfur and/phosphorus if so desired.

The supports or support precursors thus treated are, like the catalyst precursors produced exclusively by impregnation, dried before further treatment.

Another way of preparing the catalyst precursors comprises co-precipitation of a hydroxide-containing support precursor with a precursor of the active composition and a precursor of the promotor and also, optionally, with added sulfur and/or phosphorus followed by drying, as in the case of impregnation. This co-precipitation can take place, for example, in the same manner as the precipitation of a hydroxide by the addition of ammonia or aqueous ammonia solution to a solution containing soluble or hydrolysable precursor compounds of support, active composition and promotor and, optionally, containing added sulfur and/or phosphorus. This synthesis method can be advantageous when it is necessary to prepare a particularly homogeneous catalyst. In a manner similar to the aforementioned method relating to the processing of undissolved precursor compounds, the co-precipitation can be carried out, if desired, by first of all precipitating only the support precursor together with the precursor of the active composition and/or the promotor precursor and/or the added sulfur and/or phosphorus, and then to separate and dry this solid material before applying the remaining components by one or more impregnation steps or, if desired, by further precipitation.

Another possibility is the preparation of a catalyst using a pyrogenic technique, that is to say by pyrolysis or burning of a mixture of precursor compounds of the support, active composition and promotor, which method generally provides particularly pure catalysts. Suitable precursor compounds are those which are sufficiently volatile and can be pyrolyzed or burned to oxides free from residue, for example the element alkoxides or element chlorides. For example, a catalyst for use in the process of the invention can be prepared by pyrolysis of a mixture of $Ti(O^iPr)_4$, $W(OEt)_5$ and $Nb(OEt)_5$ followed by calcination. In this case also, it is possible to dope with sulfur and/or phosphorus by adding at least one volatile pyrolyzable sulfur and/or phosphorus compound, e.g. $H_2S$, $SO_2$, $SO_3$ or $PH_3$ or volatile esters of sulfuric or phosphoric acid such as the methyl or ethyl esters.

Irrespective of the synthesis method used, all of the catalyst precursors are subjected to calcination in air at temperatures of from 500° to 900° C., preferably from 550° to 850° C. and more preferably at temperatures of from 600° to 800° C. to be converted to the final catalysts. Calcination at these high temperatures is important for the achievement of a high conversion rate and thus a high space-time yield during the polymerization of THF. At lower calcining temperatures the catalysts still effect THF polymerization but only at uneconomically low conversion rates.

According to the invention, the catalysts can be additionally activated by treatment with a reducing agent following calcination. Activation of the catalysts by preliminary hydrogenation can take place in a manner similar to the method described in detail in the prior German patent application DE-A 19641481.4 of Sep. 10, 1996. Generally, for this purpose the catalyst is treated with a reducing agent following calcination and before it is used in the polymerization of THF.

Suitable reducing agents are basically all reducing agents which leave no residues on the catalysts treated therewith or the residues that are left are such as are inert to the polymerization of tetrahydrofuran and have no detrimental effect on the use of the polymerization products.

The reducing agents used can be for example organic compounds which have a reducing action on the catalysts in their calcined form, such as alcohols, aldehydes, carboxylic acids or hydrocarbons, while it is also possible to use bifunctional or polyfunctional compounds such as hydroxy acids, hydroxy aldehydes, polyalcohols, dialdehydes or polyaldehydes or diacids or polyacids or salts of organic reducing agents, of which the ammonium salts are preferred.

Examples of useful organic reducing agents are straight-chain or branched-chain aldehydes containing from one to ten carbon atoms such as formaldehyde or acetaldehyde, propionaldehyde, butyraldehyde, isobutyraldehyde or glyoxal, straight-chain, branched-chain or cyclic monocarboxylic or dicarboxylic acids or their salts such as formic acid, ammonium formate, acetic acid, propionic acid, butyric acid, isobutyric acid, oxalic acid, lactic acid, benzoic acid, citric acid or ascorbic acid, straight-chain, branched-chain or cyclic alcohols or hydrocarbons such as methanol, ethanol, propanol, isopropanal or aldoses such as glucose.

Examples of inorganic reducing agents that can be used in the process of the invention are hydrogen compounds such as hydrides with for example alkali metal tetrahydridoboranates such as sodium tetrahydridoboranate, 9-borane-bicyclononane, catechin borane, a solution of di-borane in tetrahydrofuran or in various ethers, alkali metal tetrahydridoaluminates such as lithium tetrahydridoaluminate, or simple binary hydrides such as the hydrides of alkali metals or alkaline earth metals, for example lithium hydride, sodium hydride or calcium hydride.

Preferred reducing agents used are gases containing hydrogen such as pure hydrogen or hydrogen in admixture with other gases. Particularly preferred is the use of hydrogen either in pure form or diluted with an inert gas such as nitrogen or argon. For example mixtures of nitrogen and hydrogen are highly suitable. Such mixtures can contain up to approximately 60 vol % of hydrogen in nitrogen, while hydrogen contents of up to 40 vol % or 20 vol % are likewise suitable. Generally however, a hydrogen content of up to 10 vol % is adequate. The content of hydrogen can also be successively raised during the course of the reducing reaction in order to avoid an excessively strong exothermal reaction at the start of the reaction. For example the ratio by volume of inert gas to hydrogen at the commencement of the reaction can be approximately 99:1 (or even higher, e.g. 99.5:0.5) which is generally lowered as reduction proceeds, as otherwise the necessary reduction times are prolonged. Ratios of 98:2, 95:5, 90:10, 80:20, 60:40 or 50:50 or even lower values down to pure hydrogen can be set successively or directly, use being made, if desired, of finely stepped transitions between the mixtures having different hydrogen concentrations merging on a continuous rise in the hydrogen content. The rate of increase of the hydrogen content and the final value of this hydrogen content are advantageously set according to the heat produced during the reduction so as to avoid an excessive generation of heat. An excessive generation of heat has been produced, for example, when the liberated heat of reaction can no longer be removed by the cooling system of the reduction reactor. An excessive generation of heat has also been produced, for example, when the catalyst reaches, on account of the liberated heat of reaction, a temperature which impairs its properties for the polymerization, for example when the catalyst melts, sinters or undergoes other thermal changes, at least partially, caused for example by thermal decomposition or evaporation of organic components such as extrusion auxiliaries or pelleting auxiliaries.

The treatment of the calcined catalyst with the reducing agent generally takes place at temperatures of from 20° C. to 500° C. When reduction is not effected using hydrogen-containing gases the preferred temperature range is from 100° C. to 400° C. But if the reduction is carried out using solid, liquid or dissolved reducing agents the preferred reduction temperatures range from 20° to 200° C.

When reduction is not effected by treatment of the catalyst with gaseous materials the pressure sure used is generally immaterial. If in this case the reducing agent is converted partially or completely to gaseous oxidation products as reduction of the catalyst proceeds, the reaction pressure used should not hinder the formation of these gaseous oxidation products however, that is to say a pressure which is not unduly high is generally advantageous. It can be for example between 1 and 5 bar absolute. Preferably, the reduction is carried out under standard pressure. If the reduction is carried out with gaseous reducing agents, it can take place at standard pressure or elevated pressure, for example between 1 bar and 300 bar (absolute) and preferably ferably between 1 bar and 50 bar (absolute).

The reduction time is generally from 10 minutes to 100 hours, preferably from 30 (minutes to 50 hours and more preferably from 1 hour to 24 hours.

The reducing agent is generally used in an amount of from 0.01 to 100 mol, particularly from 0.1 to 50 mol per gram of calcined catalyst and preferably in an amount of from 0.1 to 10 mol per gram of calcined catalyst.

The conditions of reduction temperature, reduction time and amount of reducing agent which are optimal for a given composition of the calcined catalyst over the general ranges stated above must in each case be determined empirically by routine reduction experiments and reaction tests, since they are governed by the content of active component in the catalyst, the type of active component used, the type of support used and the type and amount of doping agent used.

Generally, reduction is complete when the heat usually generated at the commencement of reduction has substantially subsided, after which a subsequent reduction period of from 5 minutes to 5 hours, advantageously from 10 minutes to 2 hours, can follow.

Preferably, reduction is carried out by treatment of the catalyst with a gaseous reducing agent and more preferably by treatment of the catalyst with a mixture of hydrogen and nitrogen. For this purpose the catalyst is advantageously placed in a fixed bed reactor in the form of powder or shaped particles and the gas mixture containing hydrogen is passed through the catalyst bed. The reactor has a temperature control system which makes it possible, on the one hand, to dissipate the heat generated during the reaction and, on the other hand, to maintain the required reaction temperature. Following hydrogenation, the catalyst, can be formed into shaped particles, if this has not already been done prior to hydrogenation.

The catalysts which can be used in the present invention may be employed in the process of the invention for the polymerization of THF in the form of powder, for example when the process is carried out in suspension, or advantageously as shaped particles, e.g. in the form of cylinders, balls, rings, spirals or chips, especially when the catalyst is present in a fixed bed, as is preferred when use is made of, say, loop reactors or the process is carried out continuously.

The process of the invention can be carried out in a manner similar to the processes described in detail in DE-A 4,433,606 or WO 96/09335, which are included herein by reference. The use of the comonomer 2-butyne-1,4-diol in the process of the invention can follow the lines of the method described in detail in the German patent application No. 19507399.1 (PCT application PCT/EP 96/00702), which is included herein by reference.

EXAMPLES

Preparation of the Catalyst

The catalysts were synthesized by the following technique: a kneadable composition was prepared by the addition of titanium hydroxide and the promotor compound or the precursors thereof to a solution of tungstic acid ($H_2WO_4$, prepared by the use of the corresponding amount of tungsten trioxide $WO_3$) to a 32 wt % strength aqueous ammonia solution. The amount of ammonia solution used was such as to ensure that the tungstic acid could just be dissolved without leaving a residue. If the composition was not kneadable in this form, small portions of about 10 mL of more of ammonia solution were added until a kneadable composition formed. This composition was kneaded for 120 minutes in a laboratory kneader (exceptions being the catalysts of Example 1: 150 min; Example 3: 90 min and Example V2: 180 min), then dried over a period of 12 hours at 120° C. and finally sifted after drying. The sifted powder was pelleted to form 3×3 mm pellets. The pellets were calcined in air for 2 hours at 650° C.±25° C.

The finished catalyst pellets were analyzed by means of quantitative fluorescent spectroscopy to determine their content of tungsten (calculated as tungsten trioxide, $WO_3$) and promotor (calculated as metal).

The weights of the starting materials used and also the analysis results are listed in Table 1, together with the results of the polymerization experiments.

THF Batch Polymerization

The batch polymerization experiments were carried out in 100 mL glass flasks equipped with reflux condensers under a blanket of nitrogen. 20 g of catalyst pellets, which had been dried for 18 hours at 180° C./0.3 mbar prior to use in order to remove adsorbed water, were heated in 40 g of THF containing butanediol (butanediol concentration 2000 ppm) over a period of 24 hours at 50° C. Then THF containing water (1% H2O) was added to the reaction mixture and the catalyst separated by filtration. The catalyst was washed three times with 40 g of THF each time and the filtrates were combined and concentrated at 70° C./20 mbar in a rotation evaporator and then for a further 30 min at 150° C./0.3 mbar in a bulb tube. The PTHF forming as bottoms was weighed and analyzed by gel permeation chromatography (GPC). Table 1 lists the test results obtained on the catalysts 1 to 10 and the results of two comparative examples V1 and V2.

The dispersity D as a measure of the distribution of molecular weights of the polymers produced according to the examples was calculated from the ratio of the weight average of the molecular weight ($M_w$) and the number average of the molecular weight ($M_n$) according to the equation $$D=M_w/M_n$$

$M_w$ and $M_n$ were determined by GPC, a standardized polystyrene being used for calibration. From the chromatograms the number average $M_n$ was calculated according to the equation $$M_n=\Sigma C_i/(C_i/M_i)$$

and the weight average $M_w$ according to the equation $$M_w=(\Sigma(C_i*M_i)/\Sigma C_i$$

in which $C_i$ stands for the concentration of the individual polymer species i in the polymer mixture and in which $M_i$ denotes the molecular weight of the individual polymer species i.

As shown by the experiments, the use of promoted catalysts in the process of the invention leads to an increase in yield in all cases.

The smallest measured increase in yield is found in Example 2. Even here however, this increase in yield is as much as 5% better than the yield obtained in the corresponding comparative example V2 (catalyst having a comparable content of active composition). The examples thus show that the use of the process of the invention distinctly increases the capacity of existing plants for the preparation of PTHF without the need for plant conversion or, conversely, future plants can have smaller dimensions and will therefore involve lower investment costs.

TABLE 1

Starting materials, analysis results and experimental findings

| | | | Promotor or precursor | | Analysis [wt %] | | PTHF Synthesis | | |
|---|---|---|---|---|---|---|---|---|---|
| Ex. | Ti hydroxide [g] | H₂WO₄ [g] | Type | Amount [g] | WO₃ | Promotor (metal) | Yield [%] | $M_n$ | D |
| 1 | 200 | 53 | BaSO₄ | 2 | 18.4 | 0.73 | 24 | 8310 | 2.4 |
| 2 | 150 | 32 | SnSO₄ | 29 | 17.2 | 9.20 | 21 | 8740 | 3.7 |
| 3 | 150 | 40 | Y(NO₃)₃ × 6 H₂O | 2 | 22.7 | 0.25 | 28 | 6800 | 3.2 |
| 4 | 148 | 40 | Ce(SO₄)₂ | 2 | 23.3 | 0.68 | 25 | 6850 | 2.8 |
| 5 | 150 | 30 | "Nb.-ox."*) | 10 | 17.7 | 0.54 | 34 | 7000 | 5.0 |
| 6 | 140 | 40 | (NH₄)₂Cr₂O₇ | 10 | 23.2 | 2.60 | 27 | 8230 | 3.4 |
| 7 | 148 | 40 | Mn(NO₃)₂ | 2 | 23.5 | 0.33 | 23 | 7160 | 2.9 |
| 8 | 140 | 40 | FeSO₄ | 10 | 24 | 1.30 | 31 | 6660 | 4.0 |
| 9 | 160 | 29 | FeSO₄ | 9 | 17.7 | 1.20 | 30 | 8620 | 3.4 |
| 10 | 150 | 29 | RuCl₃ | 5.5 | 17.8 | 1.20 | 25 | 8640 | 3.8 |
| V1 (comp.) | 150 | 40 | — | | 23.6 | — | 22 | 7870 | 2.2 |
| V2 (comp.) | 1000 | 200 | — | | 18.4 | — | 20 | 5790 | 2.5 |

*)"ammonium-niobium oxalate": niobium oxalate containing ammonium oxalate (obtainable from H.C. Stark)

What is claimed is:

1. A process for the preparation of polytetrahydrofuran, tetrahydrofuran copolymers, and diesters or monoesters of these polymers by the polymerization of tetrahydrofuran in the presence of at least one telogen and/or comonomer over a heterogeneous supported catalyst which contains an active component comprising a catalytically active amount of at least one oxygen-containing tungsten and/or molybdenum compound and a promoter comprising at least one element of Group 2, 3 (including the lanthanides), 5, 6, 7 8 or 14 of the Periodic Table, or a compound of such elements on an oxidic support material and which, following application of the precursor compounds of the active component and promoter to the support material precursor, has been calcined at temperatures of from 500° C. to 1000° C.

2. A process as defined in claim 1, wherein the catalyst used is supported on titanium dioxide.

3. A process as defined in claim 1, wherein the catalyst used has an active composition consisting of at least one oxygen-containing tungsten compound.

4. A process as defined in claim 1, wherein the catalyst used contains from 0.1 to 50 wt % of active composition, calculated as MoO₃ or WO₃, based on the total weight of the catalyst.

5. A process as defined in claim 1, wherein the catalyst used contains a promoter comprising at least one element, or at least one compound of such element, selected from the group consisting of Ba, Sn, Y, La, Ce, Nb, Cr, Ma, Fe and Ru.

6. A process as defined in claim 5, wherein the catalyst used contains a promoter comprising at least one element, or at least one compound of such element, selected from the group consisting of Nb, Fe, Y and Cr.

7. A process as defined in claim 1, wherein the catalyst used contains a promoter in an amount of from 0.1 to 15 wt %, calculated as the elementor elements and based on the total weight of the catalyst.

8. A process as defined in claim 1, wherein the catalyst used has been additionally doped with sulfur and/or phosphor.

9. A process as defined in claim 1, wherein the catalyst used has been activated after calcination but prior to use in the polymerization by treatment with a reducing agent.

10. A process as defined in claim 1, wherein the telogen and/or comonomer used is water, 1,4-butanediol, 2-butyne-1,4-diol, polytetrahydrofuran having a molecular weight of from 200 to 700 dalton, a $C_1$–$C_{10}$ carboxylic acid or a carboxylic anhydride derived from a $C_2$–$C_{20}$ monocarboxylic acid or a mixture of said telogens and/or comonomers.

11. A process as defined in claim 10, wherein 2-butyne-1,4-diol is used as comonomer.

12. A process as defined in claim 10, wherein acetic anhydride is used as telogen.

* * * * *

UNITED STATES PATENT AND TRADEMARK OFFICE
CERTIFICATE OF CORRECTION

PATENT NO.    : 6,211,401 B1
DATED         : April 3, 2001
INVENTOR(S)   : Eller et al.

It is certified that error appears in the above-identified patent and that said Letters Patent is hereby corrected as shown below:

Column 12, claim 7,
Line 30, "elementor" should be -- element or --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*